United States Patent
Cho et al.

(10) Patent No.: US 9,747,941 B2
(45) Date of Patent: Aug. 29, 2017

(54) METHOD FOR APPLYING SUPPLEMENTARY ATTRIBUTE INFORMATION TO E-BOOK CONTENT AND MOBILE DEVICE ADAPTED THERETO

(71) Applicant: Samsung Electronics Co., Ltd., Gyeonggi-do (KR)

(72) Inventors: Sunghyun Cho, Seoul (KR); Junegeol Kim, Gyeonggi-do (KR); Artem Kozlov, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 301 days.

(21) Appl. No.: 13/660,530

(22) Filed: Oct. 25, 2012

(65) Prior Publication Data
US 2013/0104069 A1   Apr. 25, 2013

Related U.S. Application Data (60) Provisional application No. 61/551,146, filed on Oct. 25, 2011.

(51) Int. Cl.
*G06F 3/048* (2013.01)
*G11B 20/00* (2006.01)
(Continued)

(52) U.S. Cl.
CPC ...... *G11B 20/00086* (2013.01); *G11B 27/329* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 6,714,214 B1 * | 3/2004 | DeMello | G06F 3/0482 715/702 |
| 7,779,347 B2 | 8/2010 | Christiansen et al. | |

(Continued)

FOREIGN PATENT DOCUMENTS

| | | |
|---|---|---|
| CN | 101755264 | 6/2010 |
| CN | 101986249 | 3/2011 |

(Continued)

OTHER PUBLICATIONS

ITT Dublin: Institute of Technology Tallaght, "Using Office Communicator and Live Meeting 2007," Copyright 2012, wwww.it-tallaght.ie, https://web.archive.org/web/20121014010833/http://www.it-talfaght.ie/itsupport-officecommunicator, 2007, 6 pages.

(Continued)

*Primary Examiner* — William Trapanese
(74) *Attorney, Agent, or Firm* — The Farrell Law Firm, P.C.

(57) ABSTRACT

A method that applies supplementary attribute information to the e-book content is provided. The method includes retrieving the e-book content; identifying objects in the retrieved e-book content; selecting one or more of the objects; defining one or more screen alteration attribute values regarding the selected objects; collecting an application condition for applying the defined screen alteration attribute values to the selected objects; and generating the supplementary attribute information by binding the defined screen alteration attribute values to the selected objects, and an action condition.

13 Claims, 9 Drawing Sheets

(51) Int. Cl.
  *G11B 27/32* (2006.01)
  *G11B 27/34* (2006.01)

(56) References Cited

U.S. PATENT DOCUMENTS

| | | |
|---|---|---|
| 2003/0053001 A1 | 3/2003 | Murashita et al. |
| 2003/0142110 A1 | 7/2003 | Murashita |
| 2004/0169659 A1 | 9/2004 | Kagawa et al. |
| 2004/0201633 A1* | 10/2004 | Barsness et al. ............ 345/864 |
| 2005/0081159 A1* | 4/2005 | Gupta et al. ................ 715/751 |
| 2007/0126754 A1 | 6/2007 | Edge |
| 2008/0218779 A1 | 9/2008 | Shirasawa |
| 2008/0243828 A1 | 10/2008 | Reztlaff et al. |
| 2011/0167350 A1* | 7/2011 | Hoellwarth ........... G06F 3/0483 715/727 |
| 2012/0200573 A1* | 8/2012 | Stoner et al. ................ 345/472 |
| 2013/0132814 A1 | 5/2013 | Mangini et al. |
| 2013/0207996 A1 | 8/2013 | Shibuya |
| 2014/0215302 A1 | 7/2014 | Little et al. |

FOREIGN PATENT DOCUMENTS

| | | |
|---|---|---|
| KR | 1020050078335 | 8/2005 |
| KR | 100700333 | 3/2007 |
| KR | 1020090008747 | 1/2009 |
| KR | 1020090011395 | 2/2009 |
| KR | 1020100132865 | 12/2010 |
| KR | 1020110063933 | 6/2011 |
| KR | 20110088970 | 8/2011 |
| WO | WO 01/42979 | 6/2001 |

OTHER PUBLICATIONS

U.S. Office Action dated Apr. 18, 2016 issued in counterpart U.S. Appl. No. 14/178,760, 25 pages.
U.S. Office Action dated Sep. 21, 2016 issued in counterpart U.S. Appl. No. 14/178,760, 24 pages.
Chinese Office Action dated Dec. 26 2016 issued in counterpart application No. 201210411737.3, 22 pages.
U.S. Office Action dated May 31, 2017 issued in counterpart U.S. Appl. No. 15/188,550, 18 pages.

\* cited by examiner

METHOD FOR APPLYING SUPPLEMENTARY ATTRIBUTE INFORMATION TO E-BOOK CONTENT AND MOBILE DEVICE ADAPTED THERETO

PRIORITY

This application claims priority under 35 U.S.C. §119(e) to a United States Provisional application filed on Oct. 25, 2011 in the United States Patent and Trademark Office and assigned Ser. No. 61/551,146, and under 35 U.S.C. §119(a) to a Korean patent application filed on Nov. 29, 2011 in the Korean Intellectual Property Office and assigned Serial No. 10-2011-0125782, the entire disclosure of each of which is incorporated herein by reference.

BACKGROUND OF THE INVENTION

1. Field of the Invention

This invention relates generally to electronic books (e-books), and more particularly, to a method of generating information regarding supplementary attributes for e-book content based on a user's preference and applying the information to the corresponding e-book content. Event messages also relate to a mobile device adapted to the method.

2. Description of the Related Art

Mobile communication device users use a variety of functions via large sized screens. For example, users purchase e-book content, download it to their mobile devices, and read the e-book. However, conventional e-book content does not support a modification function by the users, due to the copyright or the e-book content producer's reasons. Although the conventional service system is required to protect e-book content, it does not meet the purchase users' various expectations. Therefore, a new system is required that can protect e-book content and satisfy the users' requests of e-book content modification.

SUMMARY OF THE INVENTION

Accordingly, the present invention has been made to solve the above-stated problems occurring in the prior art, and an aspect of the present invention provides a method that defines supplementary attributes of objects included in e-book content according to a user's preference, applies the information regarding the defined supplementary attributes to the corresponding e-book content according to a user's request, and allows the user to read the e-book content in the e-book operation mode. The invention further provides a mobile device adapted to the method.

In accordance with another aspect of the present invention, a method for applying supplementary attribute information to the e-book content is provided. The method includes retrieving the e-book content; identifying objects in the retrieved e-book content; selecting one or more of the objects; defining one or more screen alteration attribute values regarding the selected objects; collecting an application condition for applying the defined screen alteration attribute values to the selected objects; and generating the supplementary attribute information by binding the defined screen alteration attribute values to the selected objects, and an action condition.

In accordance with another aspect of the present invention, a method for applying supplementary attribute information to the e-book content is provided. The method includes retrieving the e-book content; identifying the supplementary attribute information to be applied to playback of the e-book content; identifying an action condition of a mobile device, defined in the supplementary attribute information; and if the action condition is generated, controlling the alteration of displaying at least one object included in the e-book content, based on a screen alteration attribute value of an object defined in the supplementary attribute information.

In accordance with another aspect of the invention, a mobile device that applies the supplementary attribute information to the e-book content is provided. The mobile device includes a storage unit for storing supplementary attribute information bound to the electronic book (e-book) content, where the supplementary attribute information alters the display of one object included in the retrieved e-book content, selected according to an input signal; and an input unit for generating the input signal.

In accordance with another aspect of the invention, a mobile device that applies the supplementary attribute information to the electronic book (e-book) content is provided. The mobile device includes a storage unit for storing the e-book content; a display unit for displaying screens according to playback of the e-book content; and a controller for defining one or more screen alteration attribute values for defining the alteration of displaying one or more objects included in the e-book content, and an action condition for activating the screen alteration attribute values for one or more objects, with respect to the one or more objects, wherein the storage unit stores the supplementary attribute information, by binding the one or more screen alteration attribute values to the one or more objects, and the action condition.

BRIEF DESCRIPTION OF THE DRAWINGS

The above and other aspects, features and advantages of certain embodiments of the invention will become more apparent from the following detailed description viewed in conjunction with the accompanying drawings, in which.

DETAILED DESCRIPTION OF EMBODIMENTS OF THE INVENTION

Hereinafter, embodiments of the invention are described in detail with reference to the accompanying drawings.

Detailed descriptions of well-known functions and structures incorporated herein may be omitted to avoid obscuring the subject matter of the invention. A detailed description of configurations that includes the same elements and performs the same functions will not be explained repeatedly in the description.

Although the drawings represent an embodiment of the invention, the drawings are not necessarily to scale and certain features may be exaggerated or omitted in order to better illustrate and explain the invention. It should be understood that the invention is not limited to the drawing scale.

The function for setting supplementary attribute information to e-book content, according to an embodiment of the invention, allows the user to edit the e-book content to a desired form (at the viewing step) without altering the original e-book content, not the content production stage. Therefore, the supplementary attribute information setting function according to the present invention can be applied to e-books with Digital Rights Management (DRM) or e-books that were set at the production step such that they cannot be altered or edited. The supplementary attribute information setting function can support transforming static content to interactive content or dynamic content by using an action handler, etc. . . . Additionally, the supplementary attribute information setting function according to the present invention allows a user's edited content, i.e., supplementary attribute information, to interact with the content of other users, thereby creating new types of e-book content or personalizing e-book content.

Figure 1:
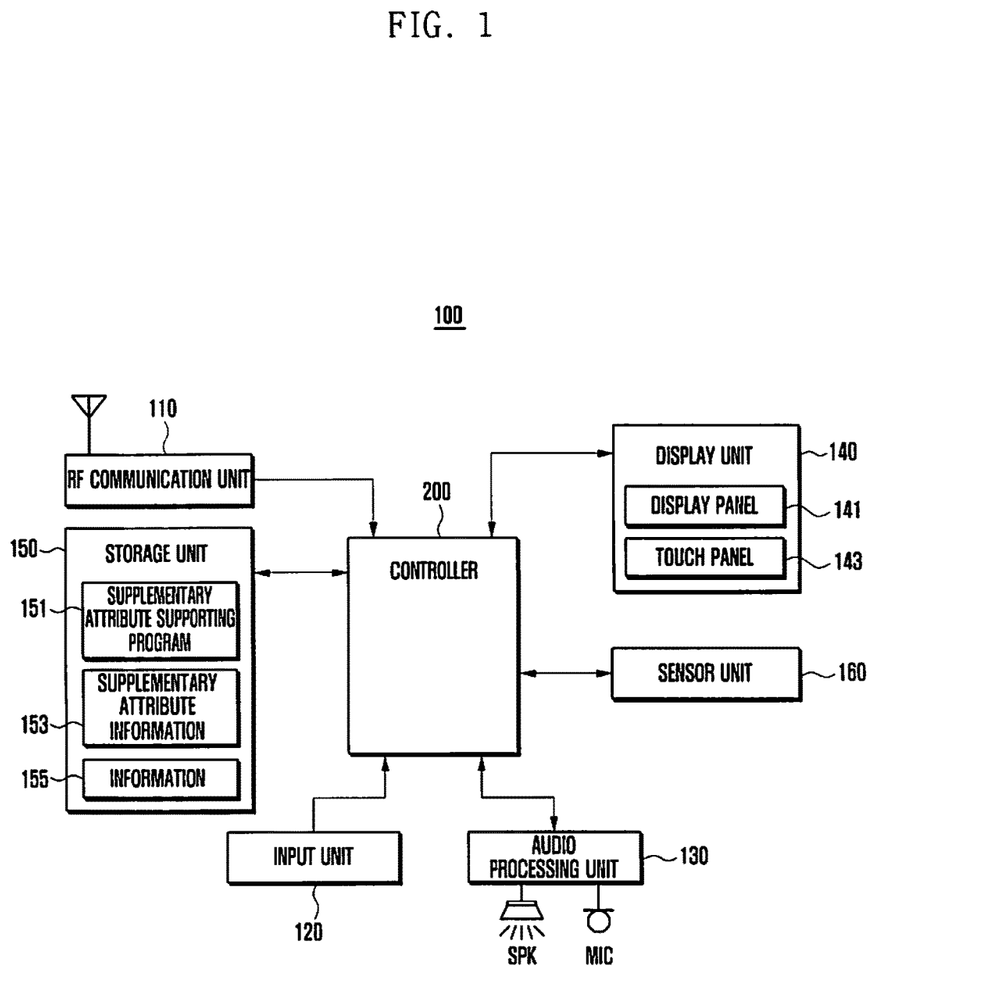
FIG. 1 is a schematic block diagram illustrating a mobile device according to an embodiment of the invention.

FIG. 1 illustrates a mobile device that supports a function for setting supplementary attribute information to e-book content, according to an embodiment of the invention.

Referring to FIG. 1, the mobile device 100 includes a Radio Frequency (RF) communication unit 110, an input unit 120, an audio processing unit 130, a display unit 140, a storage unit 150, a sensor unit 160, and a controller 200.

The mobile device 100 retrieves the e-book content from the storage unit 150 according to the user's request and displays a screen on the display unit 150 in order to play it back in a preset mode. The mobile device 100 classifies the e-book content according to the objects (such as an image object or a word object) and displays corresponding objects at preset locations on the display unit 140, thereby configuring a page. When the user selects one of the objects on the page, the mobile device 100 defines a supplementary attribute regarding the selected object. If a supplementary attribute regarding a selected object is defined, the mobile device 100 alters the screen for viewing the corresponding e-book content, based on the defined supplementary attribute. In that case, the original e-book content is not altered. Therefore, while the mobile device 100 according to the present invention allows the user to modify and view the e-book content according to his preferences, it does not alter the original e-book content, so that it can satisfy the user's needs regarding the e-book content without violating the copyright.

The RF communication unit 110 provides the communication function of the mobile device 100. The RF communication unit 110 establishes a communication channel with a web server or another mobile device according to the user's request and downloads the corresponding e-book content therefrom. If the e-book content to be downloaded includes Digital Right Management (DRM), the RF communication unit 110 transmits data related to the payment or authentication to acquire the DRM. Alternatively, the RF communication unit 110 establishes a communication channel through which the other mobile device or a web server can load the user's generated supplementary attribute information or the mobile device 100 can receive the other mobile device user's generated supplementary attribute information. The RF communication unit 110 is a mobile communication module that can support 2G, 3G, or 4 G communication, an Ethernet communication module, etc. It should be understood that the RF communication unit 110 is not limited to communication modules for supporting specific types of communication. That is, the RF communication unit 110 may be implemented with a variety of modules to establish communication channels to download e-book content and transmit supplementary attribute information regarding the e-book content.

The input unit 120 generates signals required for the operations of the mobile device 100. The input unit 120 includes a keyboard, a keypad, key buttons, etc. according to the compatibility with the mobile device. If the display unit 140 is implemented with a touchscreen, the input unit 120 can be a touch map included in virtual keys_displayed thereon. In an embodiment of the present invention, the input unit 120 generates input signals according to a user's request, for example, a signal for selecting a mode to set supplementary attribute information, a signal for altering current e-book content pages to e-book content pages to which supplementary attribute information is applied, a signal for requesting the transmission of the generated supplementary attribute information to a web server or the other mobile device, a signal for requesting the reception of supplementary attribute information from a web server or the other mobile device, etc. The input unit 120 transfers the generated input signals to the controller 200, and the controller 200 executes corresponding functions according to the input signals. The input unit 120 includes a touchscreen for supporting a function for viewing the altered e-book content. The signals generated in the input unit 120 correspond to touch events that occur on the touch panel of the display unit 140.

The audio processing unit 130 outputs audio signals that are set during the operations of the mobile device 100, generated when audio files stored in the storage unit 150 are played back, or received from the outside. The audio processing unit 130 also supports an audio signal collecting function. To this end, the audio processing unit 130 includes a SPeaKer (SPK) and a MICrophone (MIC). In an embodiment of the present invention, when an event for playing back an audio object included in the e-book content occurs, the audio processing unit 130 outputs the corresponding audio signal. If an audio object is defined in a process of setting supplementary attribute information or if an object or a page to which corresponding supplementary attribute information will be applied is selected or read, the audio processing unit 130 outputs a preset signal according to the audio object. The audio processing unit 130 outputs sound effects such as turning over pages when the e-book content is used. The audio processing unit 130 also converts a specific part of text to audio sounds and outputs them via the speaker.

The display unit 140 provides a variety of screen interfaces required for the operation of the mobile device 100. For example, the display unit 140 supports an idle screen, menu screens, etc. In an embodiment of the present invention, the display unit 140 provides a screen interface for setting supplementary attribute information to e-book content, a screen interface for supporting an alteration viewing function for e-book content where supplementary attribute information is defined, etc. The screen interfaces will be described in detail later referring to the accompanying drawings. The display unit 140 is implemented with a touchscreen. The touchscreen includes a display panel 141 and a touch panel 143, where the touch panel 143 is installed on the front of the display panel 141. The display panel 141 displays an e-book content screen that includes images, text, etc., corresponding to the screen interfaces described above. The touch panel 143 includes a touch effective area and a non-touch effective area, defined according to the features of the screens displayed on the display panel 141, and transfers a signal corresponding to a touch event that occurs on the touch effective area to the controller 200.

The touch panel 143 supports the setting of a touch area where objects for setting supplementary attribute information are selected, on the e-book content screen displayed on the display panel 141. The touch panel 143 allows for the generation of a variety of touch events required when the e-book content is read, e.g., page turning, page search, etc. The touch panel 143 also allows for the generation of touch events for selecting objects of e-book content.

The storage unit 150 stores an operation system, application programs implementing algorithms, etc., required for to operate the mobile device 100. The storage unit 150 stores a supplementary attribute-supporting program 151 for supporting a function for viewing the altered e-book content, e-book content 155 used to corresponding program, and supplementary attribute information 153 generated according to the execution of a corresponding program. The storage unit 150 serves as a memory device that stores objects called e-book content, selected according to an input signal, in a file format or a database format, including supplementary attribute information that alters the display form of the selected objects.

The supplementary attribute-supporting program 151 refers to a program for supporting a function of viewing the altered e-book content. If a signal for using the e-book content 155 is generated during the execution of a user function, the program 151 includes a function for defining supplementary attributes for objects according to the input signals. Alternatively, if a signal for using the e-book content 155 is generated, the program 151 determines whether there is supplementary attribute information 153 mapped to the e-book content 155. If supplementary attribute information 153 mapped to the e-book content 155 exists, the program 151 applies the supplementary attribute information 153 to the e-book content 155 according to the user's selection and alters the attributes of the objects on the e-book content viewing screen.

The mobile device 100 downloads the e-book content 155 from the other mobile device or a web server. To this end, the mobile device 100 is connected to the other mobile device or a web server via the RF communication unit 110, downloads the e-book content 155 via the RF communication unit 110, and stores it in the storage unit 150. The e-book content 155 includes a variety of objects, which will be described later referring to FIG. 2.

The sensor unit 160 senses the states of the mobile device 100. The sensor unit 160 is implemented with a variety of sensors, such as an acceleration sensor, a geomagnetic sensor, a pressure sensor, a gyro sensor, a luminance sensor, a proximity sensor, an image sensor, a temperature sensor, an altimeter, a biosensor, etc, or a combination thereof. The respective sensors sense corresponding signals to collect the information.

Figure 3:
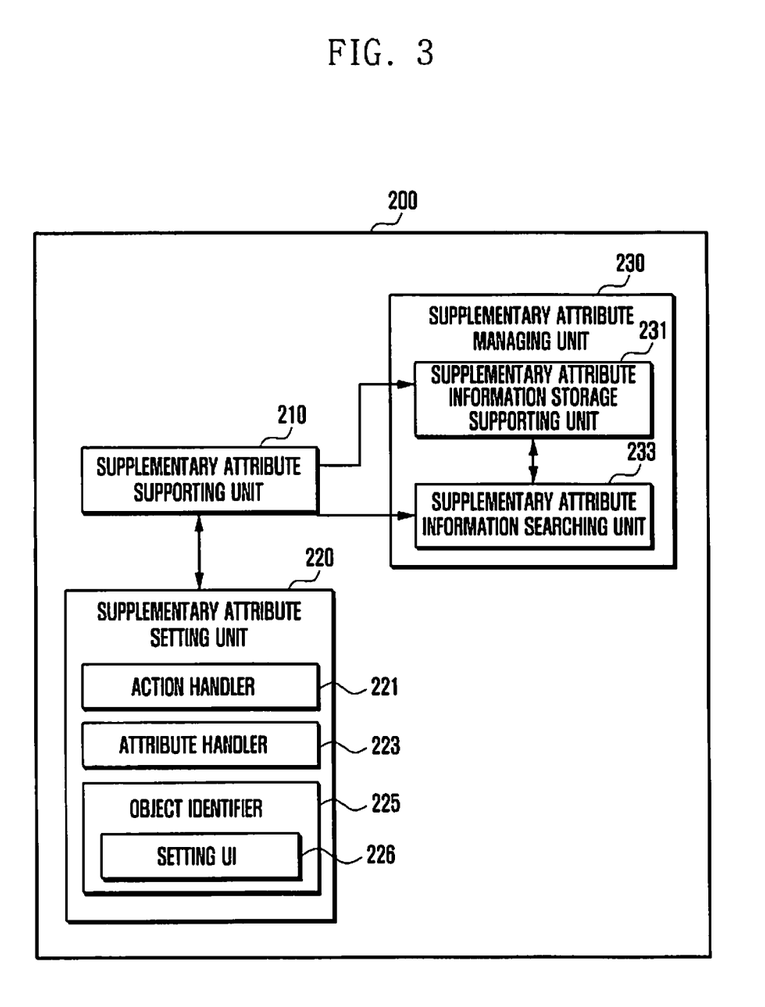
FIG. 3 illustrates a detailed view of the controller illustrated in FIG. 1.

The controller 200 controls the flow of signals required to support a function for viewing the altered e-book content, the collection of information, and the output operations. To this end, the controller 200 is configured as illustrated in FIG. 3.

Figure 2:
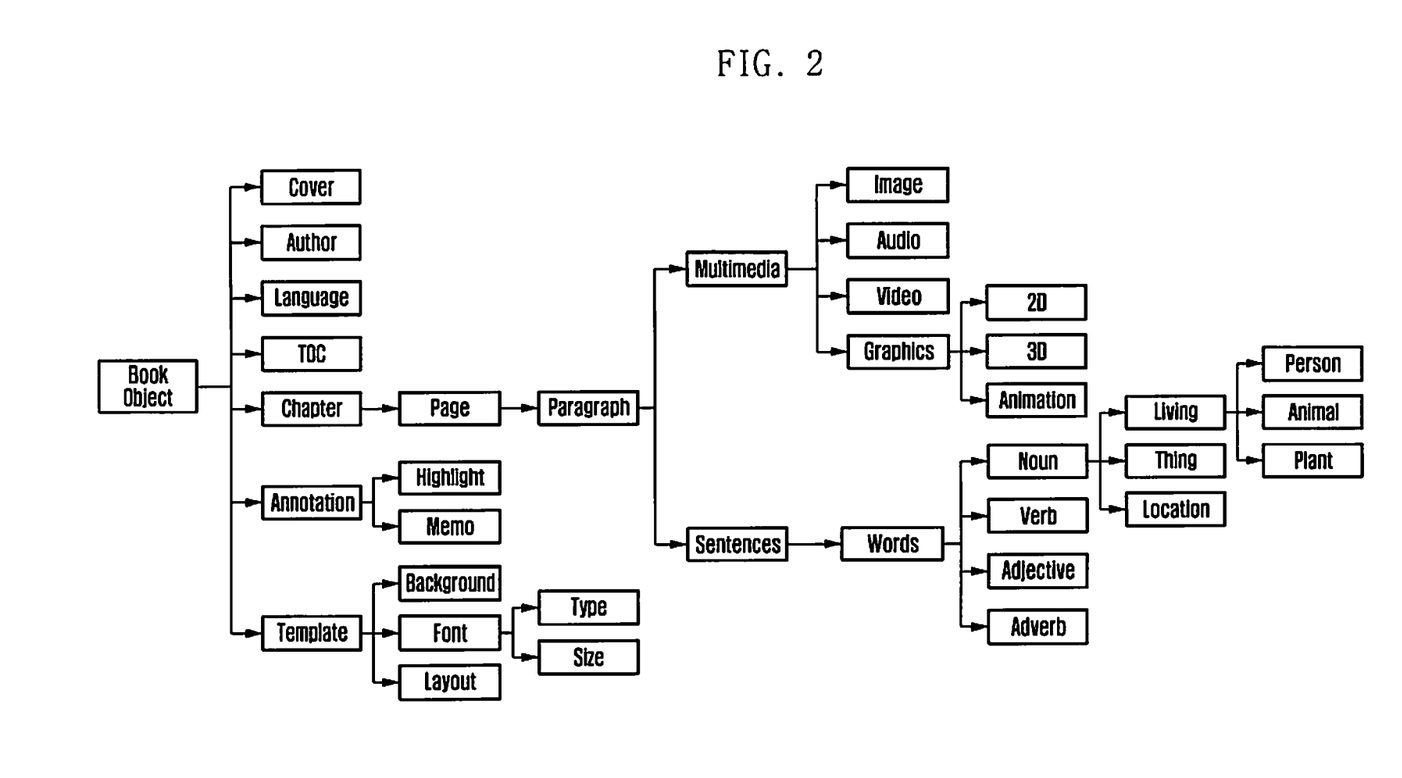
FIG. 2 illustrates a class diagram of objects of an e-book, according to an embodiment of the invention.

FIG. 2 illustrates a class diagram of objects of e-book 155, according to an embodiment of the invention.

Referring to FIG. 2, the e-book content 155 includes book objects. A book object includes a number of objects: Cover, Author, Language, Table Of Contents (TOC), Chapter, Annotation, Template, etc. The Chapter object includes Page and Paragraph objects. The Paragraph object includes Multimedia and Sentence objects. The Multimedia object includes Image, Audio, Video, and Graphics objects. Graphics object includes 2D, 3D, and animation objects. The Sentence object includes a Words object. The Words object includes Noun, Verb, Adjective, and Adverb objects. The Noun object includes Living, Thing, and Location objects. The Living object includes Person, Animal, and Plant objects. The Annotation object includes Highlight and Memo objects. The Template object includes Background, Font, and Layout objects. The Font object includes Type and Size objects. As such, the e-book content 155 includes a variety of objects. The mobile device 100 allows the user to define supplementary attributes for the objects.

The user's defined supplementary attribute information 153 is temporarily or permanently stored in the storage unit 150 and transmitted to the other mobile device or a web server according to the user's request. The mobile device 100 also downloads supplementary attribute information from the other mobile device and a web server and stores it in the storage unit 150. If the e-book content related program activates the e-book content, the supplementary attribute information is retrieved from the storage unit 150 according to the settings, and applied to the e-book content 155 displayed on the e-book content viewing screen.

FIG. 3 illustrates a detailed view of the controller 200 illustrated in FIG. 1.

Referring to FIG. 3, the controller 200 includes a supplementary attribute-supporting unit 210, a supplementary attribute-setting unit 220 and a supplementary attribute-managing unit 230.

The supplementary attribute-setting unit 220 includes an object identifier 225, an action handler 221, and an attribute handler 223.

The object identifier 225 identifies and classifies objects included in the e-book content 155 in the process of defining supplementary attribute information 153. Additionally, the object identifier 225 identifies and classifies objects included in the e-book content 155 in the process of applying supplementary attribute information 153 to the e-book content 155 or in the process of defining supplementary attribute information 153. That is, the object identifier 225 identifies and classifies objects included in the e-book content 155, described above referring to FIG. 2, and then supports the selection of corresponding objects in the process of defining supplementary attribute information 153. During this process, the object identifier 225 supports the selection of the classified objects via the touch panel 143.

If one of the objects is selected, the object identifier 225 displays, on the display unit 140, a setting UI 226 for defining a value for altering a screen attribute for the selected object and setting the action condition. The setting UI 226 refers to a pop-up window for selecting a screen alteration attribute value and/or, if an object is selected, an action condition of the selected object, or a user interface that supports the display of an auxiliary screen or a screen switching function. For example, the setting UI 226 is configured with a list screen where one or more screen alteration attribute values of an object, described in the description of the attribute handler 223, are selected. Alternatively, the setting UI 226 may be configured with a screen for describing the collection of one or more events described in the action handler 221.

The setting UI 226 according to the collection of action conditions refers to a screen that shows, if a specific object is selected and the user inputs a specific action condition to the mobile device 100, information corresponding to the action condition. Therefore, the user is able to correctly set a corresponding action condition in order to apply a corresponding attribute to his selected object.

Figure 4:
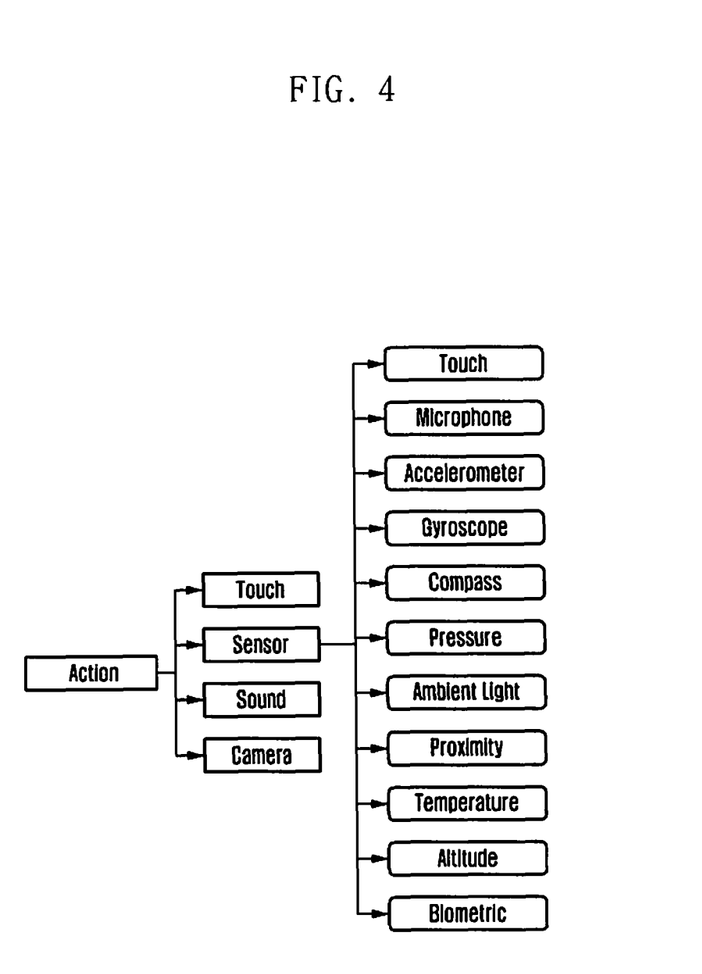
FIG. 4 illustrates a class diagram of action conditions, according to an embodiment of the invention.

The action handler 221 processes conditions to apply supplementary attribute information 153. The action handler 221 applies supplementary attribute information 153 to the e-book content 155 while it is being played back, according to one or more signals from the input unit 120, the display unit 140 and the sensor unit 160; or defines a condition to apply a corresponding screen alteration attribute value in the process of defining supplementary attribute information 153. For example, an action condition, provided by the mobile device 100, may include the events as shown in FIG. 4. The action condition of the mobile device 100 includes at least one of a Touch event, a Sensor event, a Sound event, and a Camera event. For example, the Sensor event includes at least one of a touch event (Touch) that occurs at a specific location of the mobile device; an audio event (Microphone) for collecting audio signals via the microphone; an acceleration event (Accelerometer) for acquiring accelerations via an acceleration sensor; an orientation event (Gyroscope) for acquiring orientations via a gyro sensor; a direction event (Compass) for acquiring directions via a geomagnetic sensor; a pressure event (Pressure) by a pressure sensor; a luminance event (Ambient light) by a luminance sensor; a proximity event (Proximity) by a proximity sensor; a temperature event (Temperature) by a temperature sensor; an altitude event (Altitude) by an altimeter; and a bio information event (Biometric) by a biosensor. When a supplementary attribute of a specific object is defined, the action handler 221 defines an activation condition of the supplementary attribute via collected events. To this end, the action handler 221 matches a corresponding event to an object selected when the supplementary attribute information 153 is defined.

The attribute handler 223 defines attributes to be applied to a selected object, identifies attributes of a pre-defined object when the e-book content 155 is read, and performs a movement control according to the attributes. The attribute handler 223 supports the object identifier 225 so that it can provide a list of screen alteration attribute values, where the screen alteration attribute values support respective objects in the process of defining supplementary attribute information 153. The screen alteration attribute values are defined, according to objects, by the attribute handler 223. For example, the screen alteration attribute values for an image object is defined as described in table 1, below. Likewise, the screen alteration attribute values for a text object may be defined as described in table 2, below.

TABLE 1 the screen alteration attribute values for an image object

| Properties | Enumerations |
| --- | --- |
| Translate | eProperty_Transform_Translate |
| Scale | eProperty_Transform_Scale |
| Rotation | eProperty_Transform_Rotation |
| Opacity | eProperty_Transform_Opacity |
| Perspective | eProperty_Transform_Perspective |
| Skew | eProperty_Transform_Skew |
| Snap to Grid | eProperty_Transform_Snap_To_Grid |
| Spring Bounce | eProperty_Bounce_Spring |
| Pendulum bounce | eProperty_Bounce_Pendulum |
| Rabbit jumping bounce | eProperty_Bounce_Rabbit_jumping |
| Wave bounce | eProperty_Bounce_Wave |
| Flag waving bounce | eProperty_Bounce_Flag_Waving |
| Random bounce | eProperty_Bounce_Random |
| Feather falling | eProperty_Fall_Feather |
| Rock falling | eProperty_Fall_Rock |
| Balloon flying | eProperty_Fly_Balloon |
| Smoke flying | eProperty_Fly_Smoke |
| Tear | eProperty_Tear |
| Roll | eProperty_Roll |
| Bind | eProperty_Bind |
| Paper crumbling | eProperty_Crumble_Paper |
| Hammering metal crumbling | eProperty_Cumble_Hammering_Metal |
| Fold | eProperty_Fold |
| Rub | eProperty_Rub |

TABLE 2 the screen alteration attribute values for a text object

| Properties | Enumerations |
| --- | --- |
| Translate | eProperty_Transform_Translate |
| Scale | eProperty_Transform_Scale |
| Rotation | eProperty_Transform_Rotation |
| Opacity | eProperty_Transform_Opacity |
| Perspective | eProperty_Transform_Perspective |
| Skew | eProperty_Transform_Skew |
| Snap to Grid | eProperty_Transform_Snap_To_Grid |
| Spring Bounce | eProperty_Bounce_Spring |
| Pendulum bounce | eProperty_Bounce_Pendulum |
| Rabbit jumping bounce | eProperty_Bounce_Rabbit_jumping |
| Wave bounce | eProperty_Bounce_Wave |
| Flag waving bounce | eProperty_Bounce_Flag_Waving |
| Random bounce | eProperty_Bounce_Random |
| Feather falling | eProperty_Fall_Feather |
| Rock falling | eProperty_Fall_Rock |
| Balloon flying | eProperty_Fly_Balloon |
| Smoke flying | eProperty_Fly_Smoke |
| Spin and Grow | eProperty_Text_Effect_Sping_and_Grow |
| Typewriter | eProperty_Text_Effect_Typewriter |
| Squeeze | eProperty_Text_Effect_Squeeze |
| Fade in | eProperty_Text_Effect_Fade_In |
| Explode | eProperty_Text_Effect_Explode |
| Vortex | eProperty_Text_Effect_Vortex |

The screen alteration attribute values are defined according to objects in the respective e-book content. The defined screen alteration attribute values are applied to an object according to the activation condition, according to a user's selection. To this end, the attribute handler 223 matches a screen alteration attribute value, selected in the process of defining the supplementary attribute information 153 when an object is selected, to the selected object.

Figure 5:
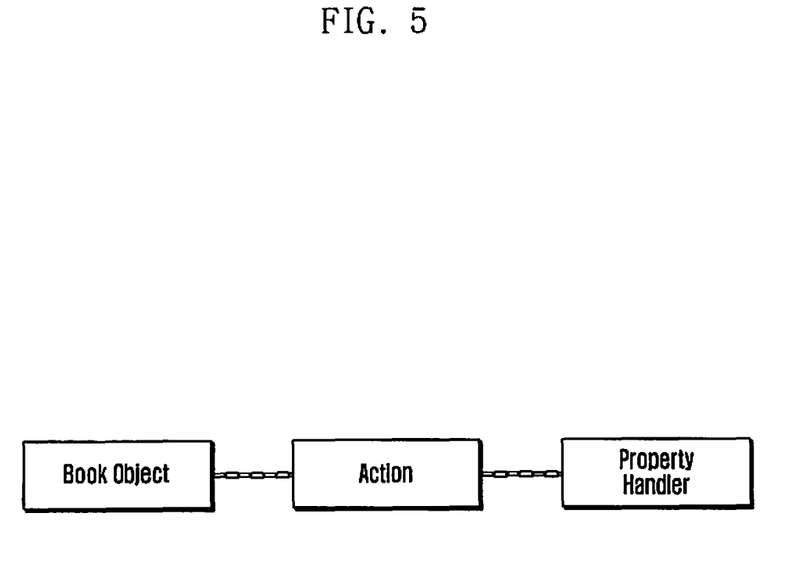
FIG. 5 illustrates the supplementary attribute information according to an embodiment of the invention.

If an object identified by the object identifier 225 is selected, an action condition is input via the action handler 221, and a screen alteration attribute value is selected via the attribute handler 223, the supplementary attribute-setting unit 220 binds the values with one another as shown in FIG. 5, and generates supplementary attribute information 153. During the process, the supplementary attribute-setting unit 220 defines action conditions and screen alteration attribute values with respect to a number of objects. Alternatively, the supplementary attribute-setting unit 220 defines different action conditions and different screen alteration attribute values with respect to the same object. Therefore, if one object has different action conditions, the supplementary attribute-setting unit 220 provides a function for altering view screen according to the different screen alteration attribute values. The supplementary attribute information 153 refers to information generated by binding at least one action condition to at least one screen alteration attribute value with respect to at least one object. The supplementary attribute-setting unit 220 transfers the generated supplementary attribute information 153 to the supplementary attribute-supporting unit 210.

The supplementary attribute-managing unit 230 includes a supplementary attribute information storage-supporting unit 231 and a supplementary attribute information-searching unit 233.

The supplementary attribute information storage-supporting unit 231 receives supplementary attribute information 153 from the supplementary attribute-supporting unit 210 and stores it in the storage unit 150. The unit 231 stores the supplementary attribute information 153 bound with attribute values in the storage unit 150. The unit 231 also stores supplementary attribute information 153 with identification information regarding corresponding e-book content 155 in the storage unit 150.

The supplementary attribute-supporting unit 210 stores/retrieves supplementary attribute information 153 related to the e-book content 155 in/from the storage unit 150. If the supporting unit 210 receives a signal for activating corresponding e-book content 155, it determines whether supplementary attribute information 153, linked to the e-book content 155, is stored in the storage unit 150, based on the identification information regarding the e-book content 155. If supplementary attribute information 153, linked to the e-book content 155, is stored in the storage unit 150, the supporting unit 210 outputs a pop-up window asking the user whether to apply the supplementary attribute information 153 to the e-book content 155. If supplementary attribute information 153, linked to the e-book content 155, exists in the storage unit 150 and a setting is made to apply the information 153 to the e-book content 155 by default, the supporting unit 210 requests that the supplementary attribute information-searching unit 233 call the supplementary attribute information 153, without performing an inquiring process. The supporting unit 210 transfers supplementary attribute information 153, searched and transferred by the searching unit 233, to the supplementary attribute-setting unit 220.

If an event occurs to select an object included in corresponding supplementary attribute information 153 or a process is made to search for a page including a corresponding object, the supplementary attribute-setting unit 220 identifies an action condition bound to the object. If an action condition satisfies a preset condition, the setting unit 220 provides a function for viewing the altered e-book content to which the attribute is applied. The condition for applying supplementary attribute information 153, i.e., a condition for selecting an object or a condition for reading a page including a corresponding object, is set according to a user's settings.

The supplementary attribute information-searching unit 233 identifies a location where the supplementary attribute information 153 has been stored, mapped to the identification information 153 regarding the e-book content 155, according to the request of the supporting unit 210, and then reads the supplementary attribute information 153 from the location. The searching unit 233 also transfers the supplementary attribute information 153 to the supporting unit 210.

As described above, the controller 200 is operated such that the supplementary attribute-supporting unit 210 processes an event related to the activation of e-book content 155; the supplementary attribute-setting unit 220 generates supplementary attribute information 153 or applies it to the e-book content 155; and the supplementary attribute-managing unit 230 stores or retrieves the supplementary attribute information 153. Therefore, the controller 200 efficiently processes the generation, storage, and application of supplementary attribute information 153.

The mobile device 100 transmits the supplementary attribute information 153 to the other mobile device or a web server according to the user's request. In that case, the supplementary attribute-supporting unit 210 of the mobile device 100 communicates with the supplementary attribute-managing unit 230 and transmits the supplementary attribute information 153 to the other mobile device or a web server according to the user's request. Alternatively, the mobile device 100 receives supplementary attribute information from the other mobile device or a web server according to the user's request. In that case, the supplementary attribute-supporting unit 210 of the mobile device 100 requests the supplementary attribute information storage-supporting unit 231 to store the received supplementary attribute information. The storage-supporting unit 231 controls the storage unit 150 to store the supplementary attribute information together with the identification information regarding the e-book content.

If a request is made to alter a screen alteration attribute value or an action condition according to the user's request when the supplementary attribute information 153 stored in the storage unit 150 is used, the supplementary attribute-setting unit 220 alters a screen alteration attribute value or an action condition. The supplementary attribute information 153 with the altered information is transferred to the storage-supporting unit 231 under the control of the supplementary attribute-supporting unit 210, according to the update request. In that case, the storage-supporting unit 231 updates the supplementary attribute information in the storage unit 150, according to the update request. The supplementary attribute information is information referring to the original e-book content, not the altered e-book content. Therefore, the information regarding an object, selected when the supplementary attribute information 153 is bound, includes the location information of the e-book content 155, e.g., information regarding page and line. When a specific page or a specific object of the e-book content 155 is output, the supplementary attribute-setting unit 220 outputs a corresponding object on the screen, based on a screen alteration attribute value defined in the supplementary attribute information 153, referring to corresponding information, without altering the original e-book content 155.

Figure 6:
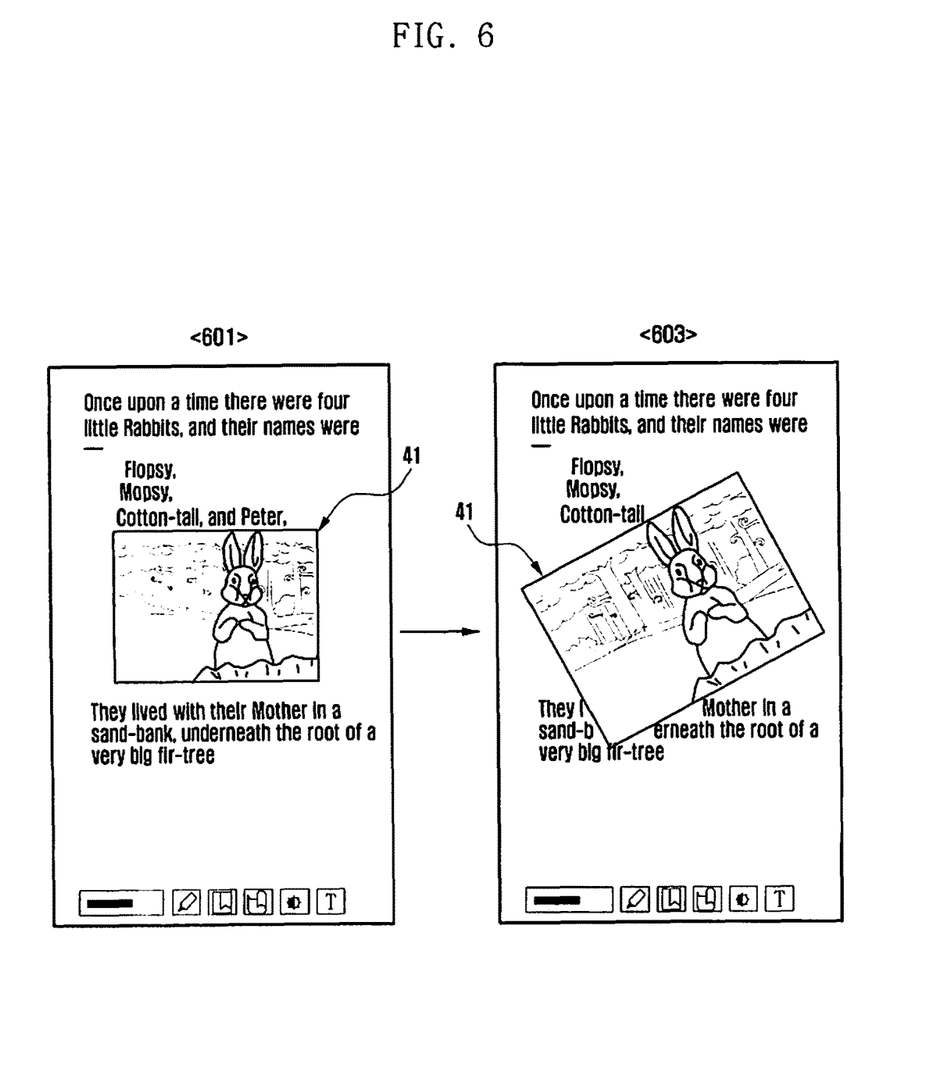
FIG. 6 illustrates a process for applying supplementary attribute information, according to an embodiment of the invention.

FIG. 6 illustrates a process for applying supplementary attribute information, by using a function for viewing the altered e-book content, according to an embodiment of the present invention.

The user generates an input signal in the mobile device 100 in order to activate e-book content 155 stored in the storage unit 150. To this end, the mobile device 100 provides a list of e-books stored in the storage unit 150. If an input signal for activating corresponding e-book content in the list is generated, the mobile device 100 activates the e-book content. The mobile device 100 controls the display unit 140 to display a screen according to the playback of the e-book content as shown in diagram 601 of FIG. 6.

Screen 601 of FIG. 6 illustrates an e-book content screen displaying text and an image. The controller 200 of the mobile device 100 determines whether supplementary attribute information 153 related to the e-book content 155 exists in the storage unit 150. The controller 200 extracts identification information regarding the e-book content 155 when a request is made to play back the e-book content, and determines whether supplementary attribute information 153 corresponding to the identification information is stored in the storage unit 150.

If the controller 200 ascertains that supplementary attribute information 153 corresponding to the identification information is stored in the storage unit 150, it calls the supplementary attribute information 153 and applies it to the screen that plays back the e-book content 155. For example, if an alteration attribute for a first image object 41 has been defined and a touch event as an action condition has been defined, the controller 200 alters, if a touch event occurs on the page including the first image object 41 or on the first image object 41, the current screen shown in screen 601 to a screen as shown in screen 603 and displays the first image object 41 on the altered screen. During the process, if the screen alteration attribute values are a scale alteration value and a rotation alteration value, the controller 200 alters the size of the screen corresponding to the scale alteration value and rotates it to an angle corresponding to the rotation alteration value.

After identifying supplementary attribute information 153, the controller 200 determines whether the first image object 41 is selected or displayed on the e-book content playback screen and also whether the action condition is transferred from the input unit 120, the sensor unit 160 and the display unit 140. If an action condition is generated, the controller 200 provides a function of altering the viewing of the first image object 41 according to the defined screen alteration attribute value, and outputs the altered, first image object 41. The screen alteration attribute value is information that defines the alteration of the view of an object.

If a setting has been made in such a way that supplementary attribute information is applied by default, the controller 200 applies, if an action condition is generated, the screen alteration attribute value to the e-book content screen, without performing an inquiry process as to whether to apply supplementary attribute information. On the contrary, if the application of supplementary attribute information is set such that it is not executed in a default mode, the controller 200 applies supplementary attribute information to the e-book content according to the application request input signal. Alternatively, if the supplementary attribute information 153 exists, the controller 200 outputs a pop-up message window asking the user whether to apply the supplementary attribute information to the e-book content and then apply it according to the user's selection.

If the application of supplementary attribute information is set to be executed in a default mode, the supplementary attribute information 153 to be applied to the e-book content 155 requested for playback is not stored in the storage unit 150, the controller 200 only displays a screen for playing back the e-book content 155. Alternatively, the controller 200 recommends other mobile device or a web server that provides the supplementary attribute information 153 related to the e-book content 155 requested for playback, according to a preset schedule or a user's request. In that case, the mobile device 100 accesses the other mobile device and a web server, downloads the supplementary attribute information 153 therefrom and applies it to the e-book content 155 during the playback, under the control of the controller 200.

Figure 7:
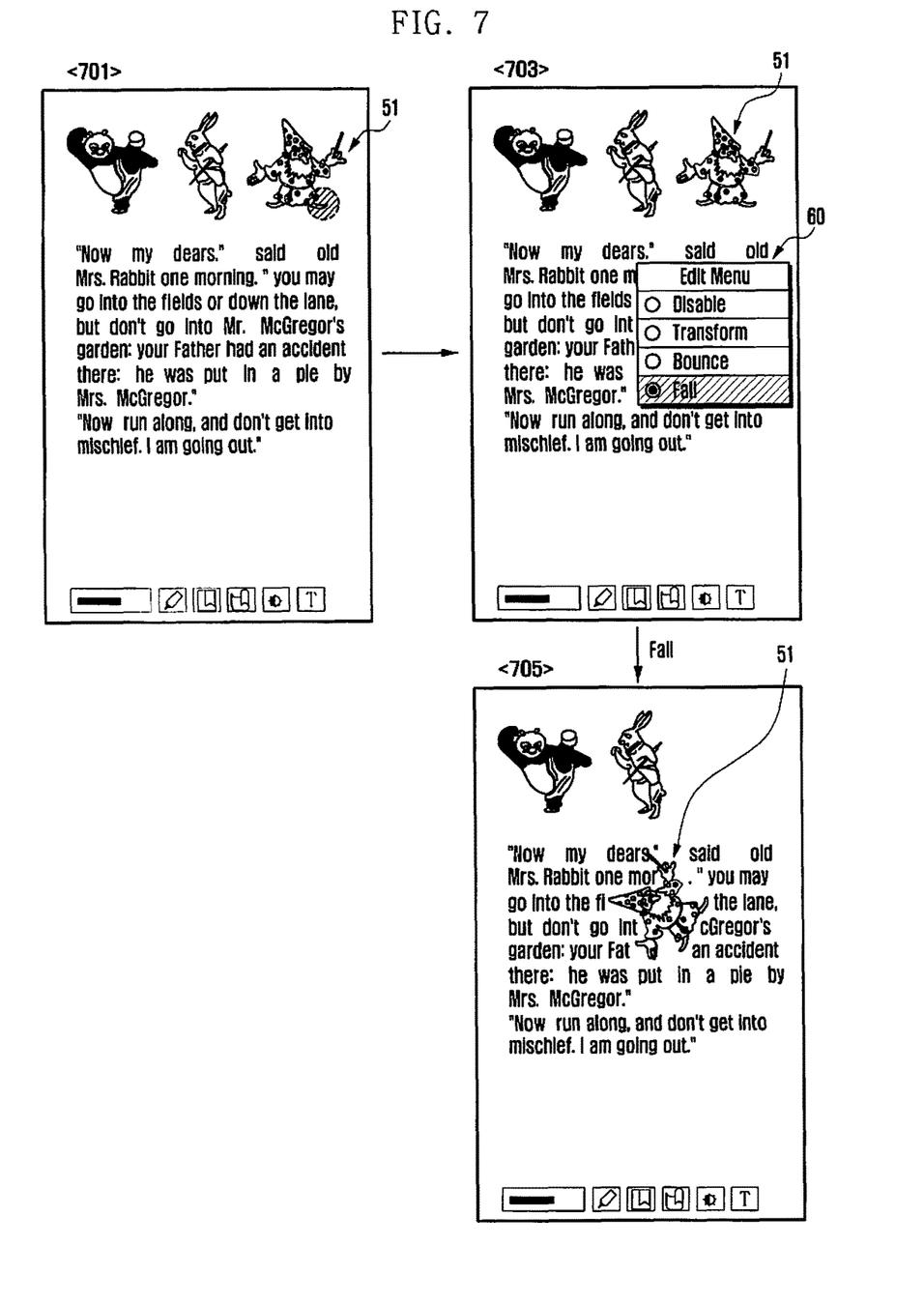
FIG. 7 illustrates a process for setting supplementary attribute information, according to an embodiment of the invention.

FIG. 7 illustrates a process for setting supplementary attribute information, by using a function for viewing the altered e-book content, according to an embodiment of the invention.

The user selects the e-book content 155 in the storage unit 150 in order to set supplementary attribute information 153 thereto. To this end, the controller 200 of the mobile device 100 provides menu items for setting supplementary attribute information. When a corresponding menu item is selected, the controller 200 provides an e-book content list for setting supplementary attribute information. Alternatively, the controller 200 allows the user to set the supplementary attribute information while using the e-book content 155. To this end, the controller 200 controls the display unit 140 to display items for executing the function for setting supplementary attribute information 153 on one side of the screen or provides a menu list including the items, during the playback of the e-book content 155.

If the user requests the playback of e-book content 155 or selects an e-book content 155 to be set with supplementary attribute information 153, the controller 200 controls the display unit 140 to display a screen showing text and image objects as shown in diagram 701 of FIG. 7. The controller 200 detects objects included in a page of the e-book content 155, currently displayed on the display unit 140, or the entire page of the e-book content 155, according to a request for setting supplementary attribute information. The controller 200 activates a touch area so that the user can select the detected objects and define the supplementary attributes. The user then touches corresponding objects where supplementary attributes will be defined.

For example, if the user selects a second image object 51 as illustrated in screen 701, the controller 200 controls the display unit 140 to display a pop-up window 60 for selecting at least one of the screen alteration attribute values and action conditions for the selected second image object 51 as shown in screen 703. The pop-up window 60 includes a list of items for selecting screen alteration attribute values and/or a list of items for selecting action conditions. Alternatively, the pop-up window 60 includes only an action condition setting mode, instead of a list of items for selecting action conditions. When the mobile device 100 operates in an action condition setting mode, the user can set an action condition via the input unit 120, sensor unit 160, and/or touch panel 143. If an action condition has not been set to the mobile device 100, the controller 200 automatically sets a tap event, a flick event, etc., on a corresponding object or a page, to a specific action condition, by default. If any action condition has not been set, other than an event for reading a page including a corresponding object, the mobile device 100 is set with only one action condition.

The list of items for selecting screen alteration attribute values is a list of attribute group items. The screen alteration attribute values provide a list that can select one of group values, Transform, Bounce, Fly, Fall, etc. If a specific group item is selected, the screen alteration attribute values supported by the selected group item can be controlled via touch events. For example, if a Transform item is selected from the group list in a state where the second image object 51 has been selected, the user can define attributes for transform by generating a variety of touch events. For example, the user touches one edge of the second image object 51 and drags it to rotate in a direction, thereby defining the alteration attribute of the second image object 51 as rotation. Likewise, the user multi-touches both edges of the second image object 51, and drags them to increase or decrease in size by a certain ratio, thereby defining the alteration attribute of the second image object 51 as size alteration.

As illustrated in diagram 703, the user defines the falling attribute of the second image object 51. That is, the user defines a screen alteration attribute value so that the second image object 51 falls like a feather. The user selects an attribute of Fall from a group list of screen alteration attribute values, makes a zigzag touch gesture corresponding to a falling form of a feather with respect to the second image object 51, and defines the screen alteration attribute value. The action condition is an action condition where a page including the second image object 51 is read, i.e., a page is displayed on the display unit 140 or a certain period of time has elapsed after the page is displayed, or a condition where a corresponding page is touched. The controller 200 performs an operation according to a user's selected screen alteration attribute value for the second image object 51 as shown in screen 705, thereby displaying the effect of how the user's set screen alteration attribute value is implemented.

If the screen alteration attribute value of the second image object 51 is defined and an action condition is selected, the controller 200 binds the second image object 51, screen alteration attribute value, and action condition together and generates one piece of supplementary attribute information 153. If the user defines a specific screen alteration attribute value with respect to the same object or different objects and also an action condition, the controller 200 adds corresponding information 153 to corresponding supplementary attribute information 153. Therefore, the supplementary attribute information 153 includes attribute information regarding one or more objects.

Although the above-described embodiment is implemented in such a way that an object is first selected and the supplementary attribute of the selected object is set, it should be understood that the invention is not limited to this embodiment. That is, the embodiment can be modified in such a way that the controller 200 first calls a pop-up window 60 for defining screen alteration attribute values for a specific object, selects a corresponding screen alteration attribute value, and selects an object to which the screen alteration attribute value will be applied. In order to set an action condition, the controller 200 sets a signal/signals, input before and after a screen alteration attribute value is selected and/or an object is selected, as an action condition. Alternatively, a state where any action is not generated is set as an action condition.

Figure 8:
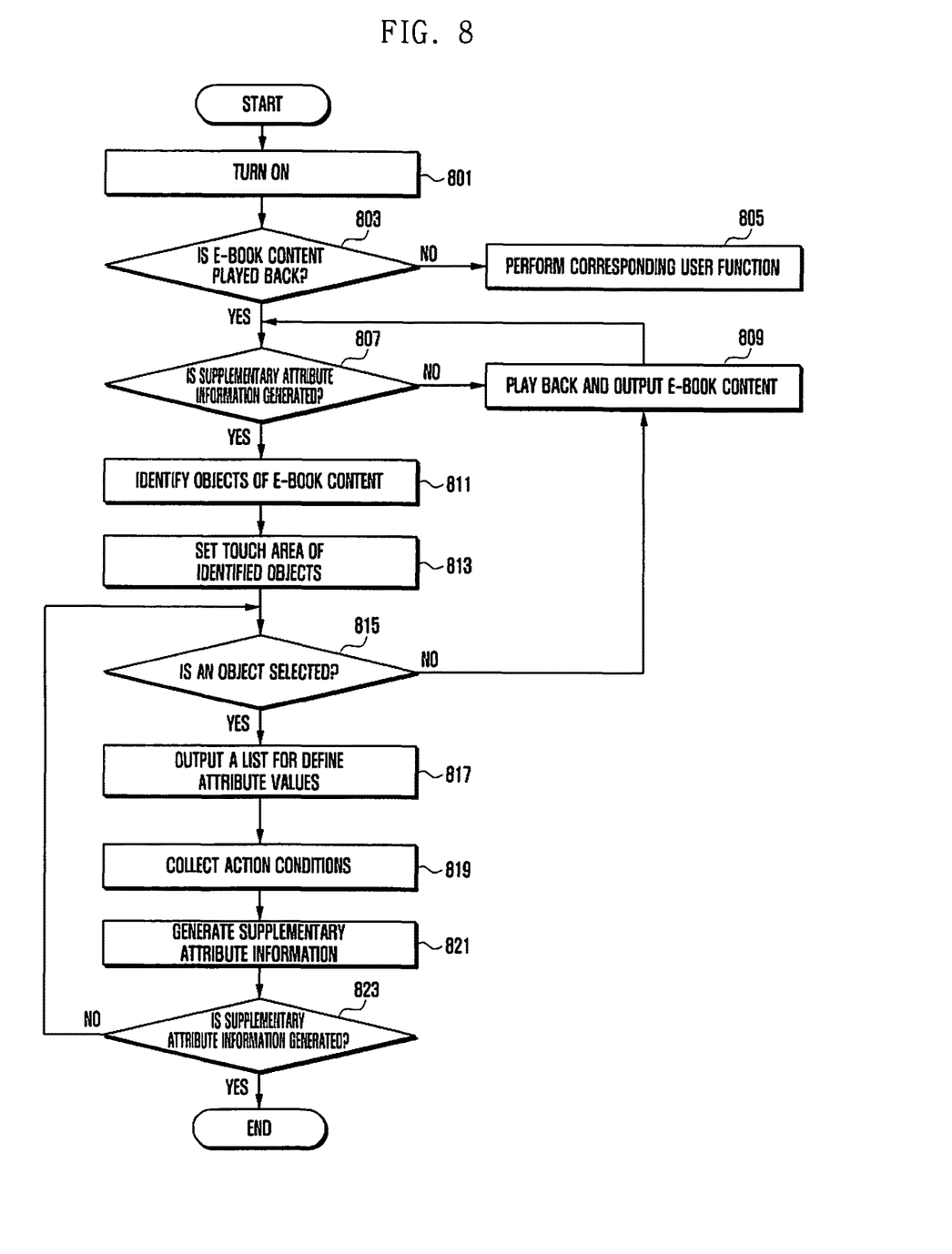
FIG. 8 illustrates a flowchart of a method for setting supplementary attribute information, according to an embodiment of the invention.

FIG. 8 illustrates a flowchart of a method for setting supplementary attribute information regarding e-book content, according to an embodiment of the invention.

Referring to FIG. 8, when a mobile device 100 is turned on in step 801, the controller 200 initializes the components in the mobile device 100 to execute a user function. In particular, the controller 200 supplies electric power to the display unit 140 and the storage unit 150 in order to generate supplementary attribute information.

The controller 200 determines whether a call signal is generated to play back e-book content 155 in step 803. If the controller 200 determines that an input signal is not a call signal for playing back e-book content 155 at step 803, it executes a user function corresponding to the input signal in step 805. For example, the controller 200 accesses a web server or the other mobile device and downloads supplementary attribute information or executes a broadcast viewing function, a call function, an audio file playback function, etc., according to the input signal.

To the contrary, if the controller 200 ascertains that an input signal is a call signal for playing back e-book content 155 at step 803, it determines whether a mode where supplementary attribute information is generated is set or an item for generating supplementary attribute information is selected in step 807. If a request has not been made to generate supplementary attribute information at step 807, the controller 200 displays a screen according to the playback of the e-book content 155 in step 809.

However, if a request has been made to generate supplementary attribute information at step 807, the controller 200 identifies objects of the e-book content 155 in step 811. The controller 200 sets a touch area on which the objects are displayed so that the user can select a corresponding object and set the screen alteration attribute value and the action condition in step 813.

The controller 200 then determines whether an object is selected in step 815. If an input signal is not generated to select an object at step 815, the controller 200 automatically releases a supplementary attribute information generating mode after a certain period of time has elapsed and returns to step 809.

However, if an input signal is generated to select an object at step 815, the controller 200 controls the display unit 140 to display a list of items for defining screen alteration attribute values of the selected object in step 817. If a screen alteration attribute value is selected at step 817, the controller 200 enters an action condition setting mode and acquires an action condition in step 819. In order to collect action conditions, the controller 200 activates at least one of the input unit 120, sensor unit 160, and touch panel 143, and receives input signals as action conditions, e.g., key input signals, sensed signals, and touch signals. To this end, a mode for collecting action conditions is further provided. That is, when input signals are collected in an action condition collecting mode, the controller 200 detects them as action conditions; however the controller 200 processes the other input signals not in an action condition collecting mode, as signals for operating the mobile device 100.

The controller 200 binds the selected object, selected screen alteration attribute value, and set action condition, to one another, and generates and stores the supplementary attribute information 153 in step 821. The controller 200 determines whether an input signal is generated to set the supplementary attribute information 153 in step 823. If the controller 200 determines that an input signal is generated to set the supplementary attribute information 153 at step 823, it stops the supplementary attribute information setting procedure. However, if the controller 200 determines that an input signal is not generated to set the supplementary attribute information 153 in step 823, it returns to and proceeds to step 815. Therefore, the controller 200 generates supplementary attribute information 153 that defines the action conditions and the attributes for a number of objects.

Although the above-described embodiment is implemented in such a way that outputting a list for defining screen alteration attribute values follows selecting an object, it should be understood that the invention is not limited to this embodiment. That is, it can be modified such that outputting a list for defining screen alteration attribute values is executed before objects of the e-book content 155 are identified at step 811.

Figure 9:
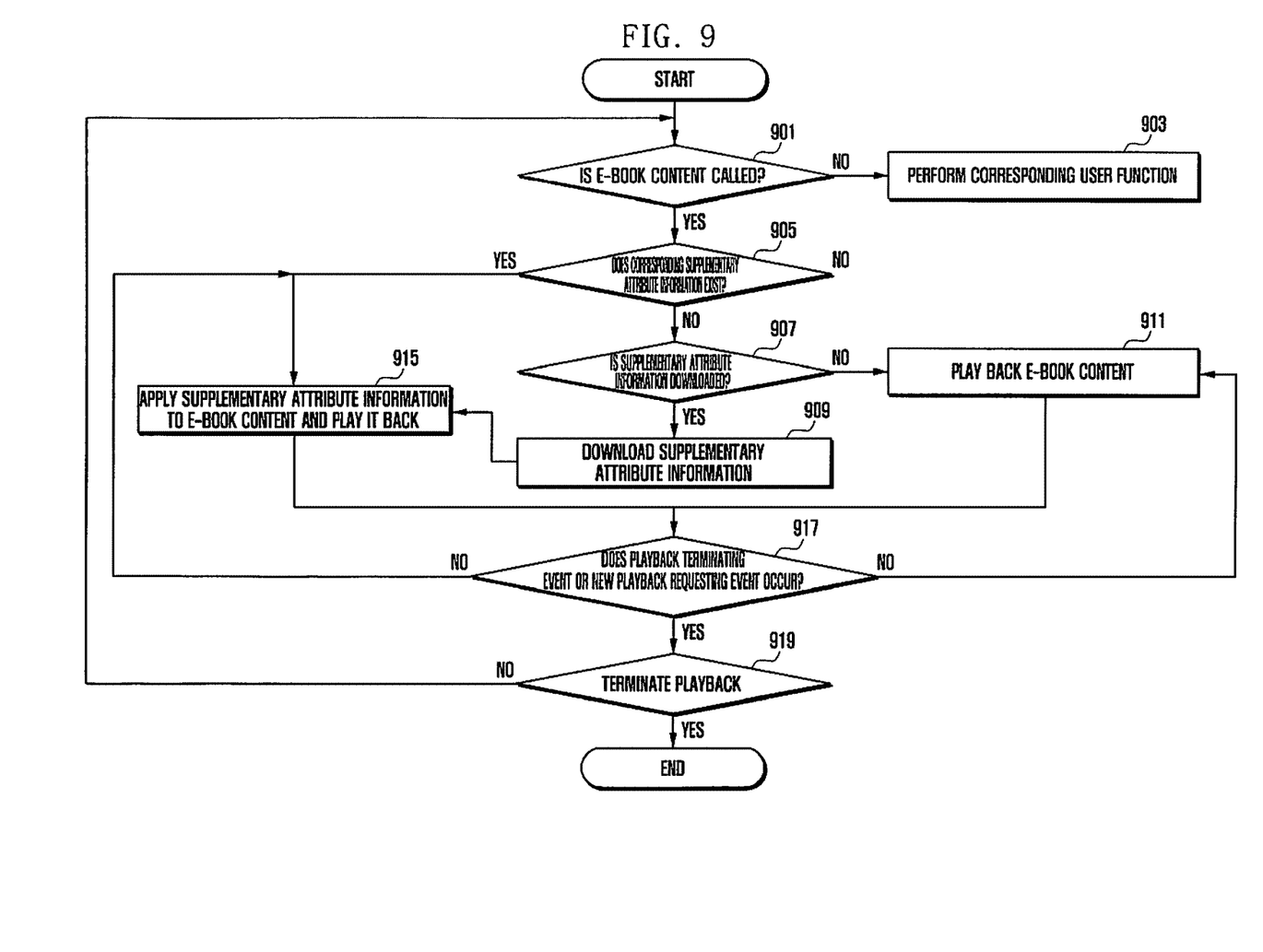
FIG. 9 illustrates a flowchart of a method for applying supplementary attribute information, according to an embodiment of the invention.

FIG. 9 illustrates a flowchart of a method for applying supplementary attribute information, according to an embodiment of the invention.

Referring to FIG. 9, when the controller 200 receives an input signal, it determines whether it is a signal for calling the e-book content 155 in step 901. If the input signal is not a signal for retrieving the e-book content 155 in step 901, the controller 200 executes a user function corresponding to the input signal in step 903.

However, if the input signal is a signal for retrieving the e-book content 155 in step 901, the controller 200 determines whether supplementary attribute information 153 to be applied to corresponding e-book content 155 is stored in the storage unit 150 in step 905. To this end, the controller 200 collects identification information regarding the e-book content 155 and determines whether the supplementary attribute information 153 corresponding to the identification information is stored in the storage unit 150. Supplementary attribute information is stored, associated with corresponding identification information, in the storage unit 150.

If the controller 200 determines that supplementary attribute information 153 to be applied to corresponding e-book content 155 has not been stored in the storage unit 150 in step 905, it determines whether to download the supplementary attribute information for the e-book content 155 from a web server or the other mobile device in step 907. If the mobile device user generates the download signal at step 907, the controller 200 accesses a web server or the other mobile device and downloads the supplementary attribute information therefrom in step 909. However, if the mobile device user does not generate the download signal at step 907, the controller 200 only plays back the e-book content 155 in step 911. If the controller 200 determines that supplementary attribute information 153 to be applied to corresponding e-book content 155 has been stored in the storage unit 150 at step 905, it applies the information 153 to the e-book content 155 and plays back it in step 915.

After playing back the e-book content 155 in steps 911 or 915, the controller 200 determines whether an event occurs to stop playing back the e-book content 155 or an input signal is generated to play back new e-book content in step 917. If an event for stopping playing back the e-book content 155 has occurred at step 917, it determines whether the playback is terminated in step 919. If a signal for terminating the playback is not generated at step 919, the controller 200 returns to and proceeds with step 901. If an input signal is generated to play back new e-book content at step 917, the controller 200 returns to and proceeds with step 905.

However, if the controller 200 determines that an event for stopping playing back the e-book content 155 has not occurred or an input signal for playing back new e-book content has not been generated at step 917, the controller 200 returns to or proceeds with step 911 or 915.

Although the above-described embodiment describes the generation and application of supplementary attribute information 153, the controller 200 may alter the supplementary attribute information that was previously stored or is newly downloaded or may alter the action condition. For example, if an input signal is generated to alter supplementary attribute information regarding the e-book content 155, the controller 200 plays back the e-book content 155, identifies the objects, and then supplementary attribute information of an object, defined by the user. The controller 200 then updates supplementary attribute information applied to corresponding e-book content, with the newly defined supplementary attribute information, according to the user's request. If there is no user's request for updating supplementary attribute information, the controller 200 controls the storage unit 150 to store the new supplementary attribute information regarding the e-book content 155.

Therefore, the invention can provide at least one supplementary attribute with respect to at least one e-book content. If there are a number of supplementary attributes, the invention allows the user to select his desired supplementary attribute while the e-book content 155 is being played back and to apply it to the e-book content 155. The mobile device 100 is set in such a way that part of a number of supplementary attributes are set, by default, to be applied to the e-book content when it is played back. If part of the supplementary attributes is set, by default, to be applied to the e-book content, the user can select the other supplementary attributes via menus, etc.

As described above, the e-book content supplementary attribute information applying method and the mobile device adapted thereto, according to the invention, allows the user to modify the e-book content according to his preference based on the setting of the supplementary attribute information and to read it. The present invention allows the user to read the same e-book content in a variety of modes by sharing the supplementary attribute information.

Although it is not shown in the drawings, the mobile device may selectively further include various types of components, for example: a short-range communication module for short-range communication; a camera module for acquiring still images/videos; an interface for transmitting/receiving data in a wireless or wired mode; an Internet communication module; and a digital broadcast module for receiving and reproducing broadcasts. With the spread of digital convergence, although it is impossible to list all the modifications of mobile devices in this description, it will easily be appreciated to those skilled in the art that the other components equivalent to the above-listed components may be further included to the mobile device according to the invention. It will also be appreciated that the mobile device may be implemented by omitting a particular component or replacing it with other components.

The mobile device according to the invention includes all information communication devices, multimedia devices, and their applications, which include an earphone interface that various types of jacks for earphones are plugged into and are operated according to communication protocols corresponding to various types of communication systems. For example, the mobile device can be applied to mobile communication terminals, Portable Multimedia Players (PMPs), digital broadcast players, Personal Digital Assistants (PDAs), audio players (e.g., MP3 players), mobile game players, smartphones, laptop computers, hand-held PC, etc.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method for generating supplementary attribute information for electronic book (e-book) content, the method comprising:
   receiving the e-book content;
   identifying objects in the received e-book content;
   detecting a selection of one or more of the objects;
   outputting a list of items corresponding to one or more screen alteration attribute values for modifying a value of a screen alteration attribute of a selected object on a pop-up window;

receiving a selection of the one or more screen alteration attribute values in the pop-up window;

collecting an action condition for altering the value of the screen alteration attribute of the selected object to the selected one or more screen alteration attribute values; and generating the attribute information by binding the selected one or more screen alteration attribute values to the selected object, and the action condition.

2. The method of claim 1, further comprising:

storing the attribute information; and updating, if attribute information to be applied to the e-book content has been previously stored, the previously stored attribute information with newly generated attribute information, or storing the attribute information to be applied to the e-book content, separately from the previously stored attribute information.

3. The method of claim 2, further comprising:

accessing a mobile device or a web server; and transmitting the stored attribute information to the mobile device or the web server.

4. The method of claim 1, wherein receiving the selection of the one or more screen alteration attribute values includes at least one of:

applying a screen alteration attribute value of one selected from the list of items to a screen alteration attribute value of the selected object; and defining the screen alteration attribute value according to a touch event that occurs on the object displayed on a touch panel.

5. The method of claim 1, wherein receiving the selection of the one or more screen alteration attribute values includes defining a number of screen alteration attribute values for one object; and wherein collecting the action condition includes collecting a number of action conditions for activating a number of screen alteration attribute values respectively.

6. A mobile device that generates and applies attribute information to electronic book (e-book) content, the mobile device comprising:

a memory for storing the e-book content;

a display device for displaying screens according to playback of the e-book content; and a processor for:

outputting a list of items corresponding to one or more screen alteration attribute values for modifying a value of a screen alteration attribute of a selected object on a popup window, receiving a selection of the one or more screen alteration attribute values in the pop-up window, and setting an action condition for altering the value of the screen alteration attribute of the selected object to the selected one or more screen alteration attribute values, wherein the memory stores the attribute information generated by binding the selected one or more screen alteration attribute values to the selected object and the action condition.

7. The mobile device of claim 6, wherein, if attribute information to be applied to the e-book content has been previously stored, the processor updates the previously stored attribute information with newly generated attribute information, or stores the attribute information to be applied the e-book content, separately from the previously stored attribute information.

8. The mobile device of claim 7, further comprising:

a communication unit for establishing a communication channel, so that the mobile device accesses another mobile device or a web server, and transmits the stored attribute information to the other mobile device or the web server, via the communication channel, according to a user's request.

9. The mobile device of claim 8, wherein the communication unit further:

establishes the communication channel, such that the mobile device uses attribute information provided by the web server or the other mobile device, via the communication channel, and wherein the other mobile device has been previously registered at the mobile device.

10. The mobile device of claim 6, further comprises:

a touch panel, wherein when a touch event occurs to control the alteration of an object displayed on the touch panel, the processor defines the touch event as a screen alteration attribute value.

11. The mobile device of claim 6, wherein the processor supports definition of a number of screen alteration attribute values for one object, collects action conditions for activating respective screen alteration attribute values, and matches the action conditions and the respective screen alteration attribute values with one another.

12. The mobile device of claim 6, wherein if a request is made to play back the e-book content, the processor identifies attribute information to be applied to the playback of the e-book content, and alters the display of one or more objects included in the e-book content, based on a screen alteration attribute value matched when an action condition of the mobile device defined in the attribute information meets a preset condition.

13. The mobile device of claim 6, wherein the processor:

if attribute information to be applied to the e-book content does not exist, determines whether to download the attribute information, downloads the attribute information from a web server or another mobile device, and applies the attribute information to the e-book content, according to a user's request; and if a number of attributes are searched, an attribute, set by default, applies to the playback of the e-book content or selects a specific one of the attributes according to a user's request.

* * * * *